(12) United States Patent
Abramson et al.

(10) Patent No.: US 9,237,200 B2
(45) Date of Patent: Jan. 12, 2016

(54) SEAMLESS MOVEMENT BETWEEN PHONE AND PC WITH REGARD TO APPLICATIONS, DISPLAY, INFORMATION TRANSFER OR SWAPPING ACTIVE DEVICE

(75) Inventors: Sandra Abramson, Freehold, NJ (US); Mehmet C. Balasaygun, Freehold, NJ (US); John Buford, Princeton, NJ (US); Anthony Frissora, Fair Haven, NJ (US); Michael J. Killian, Toms River, NJ (US); Raj Sinha, West Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 28 days.

(21) Appl. No.: 12/922,829

(22) PCT Filed: Aug. 17, 2010

(86) PCT No.: PCT/US2010/045769
§ 371 (c)(1),
(2), (4) Date: Sep. 15, 2010

(87) PCT Pub. No.: WO2011/022407
PCT Pub. Date: Feb. 24, 2011

(65) Prior Publication Data
US 2012/0136917 A1    May 31, 2012

Related U.S. Application Data

(60) Provisional application No. 61/235,838, filed on Aug. 21, 2009.

(51) Int. Cl.
*G06F 15/16* (2006.01)
*H04L 29/08* (2006.01)
(Continued)

(52) U.S. Cl.
CPC ............... *H04L 67/24* (2013.01); *G06F 9/543* (2013.01); *H04L 65/403* (2013.01); *H04L 67/04* (2013.01);
(Continued)

(58) Field of Classification Search
CPC ......... H04L 63/10; H04L 67/10; H04L 67/42; G06F 9/4445; G06F 9/45533
USPC .......................................................... 709/203
See application file for complete search history.

(56) References Cited

U.S. PATENT DOCUMENTS 5,898,861 A * 4/1999 Emerson et al. ................ 703/23
7,266,776 B2 9/2007 Quillen et al.
(Continued)

FOREIGN PATENT DOCUMENTS

EP        2283436        2/2011
EP        2359243        8/2011
(Continued)

OTHER PUBLICATIONS

Marinescu, Dan, and Reinhold Kröger. "State of the art in autonomic computing and virtualization." Distributed Systems Lab, Wiesbaden University of Applied Sciences (2007): 1-24.*
(Continued)

*Primary Examiner* — Taylor Elfervig
(74) *Attorney, Agent, or Firm* — Sheridan Ross P.C.

(57) ABSTRACT

It would be beneficial to allow one or more of information, applications, desktops, and in general any information to be shared between a computer and a communications device. For example, it would be useful to be able to move a presentation from a computer to a mobile communications device. Some solutions attempt to address this by requiring a user to load the information on a laptop, USB key, burn it to an optical disk or the like, and then "open" the information on another device located at the remote destination. In one embodiment, through the use of one or more of virtualization and content translation, any information and/or applications can be exchanged between a computer and a communications device. More specifically, one embodiment utilizes metadata in conjunction with a virtualization environment to allow the exchange of information and/or applications between a personal computer and a communications device, or vice versa.

19 Claims, 8 Drawing Sheets

(51) Int. Cl.
*G06F 9/54* (2006.01)
*H04L 29/06* (2006.01)
*H04M 7/00* (2006.01)
*H04W 4/02* (2009.01)
*H04W 64/00* (2009.01)

(52) U.S. Cl.
CPC ........... *H04L 67/306* (2013.01); *H04M 7/0057* (2013.01); *H04W 4/02* (2013.01); *H04W 64/00* (2013.01)

(56) References Cited

U.S. PATENT DOCUMENTS

| | | | |
|---|---|---|---|
| 7,574,442 B2* | 8/2009 | Takeda et al. | 1/1 |
| 8,099,676 B2* | 1/2012 | Semple et al. | 715/773 |
| 8,146,004 B2 | 3/2012 | Koch | |
| 8,184,099 B2* | 5/2012 | Agata et al. | 345/168 |
| 2003/0093466 A1 | 5/2003 | Jarman et al. | |
| 2003/0179154 A1 | 9/2003 | Demsky et al. | |
| 2004/0172584 A1 | 9/2004 | Jones et al. | |
| 2005/0218739 A1 | 10/2005 | Maddin et al. | |
| 2005/0267972 A1 | 12/2005 | Costa-Requena et al. | |
| 2005/0268302 A1 | 12/2005 | Geib et al. | |
| 2006/0070067 A1* | 3/2006 | Lowery | 718/100 |
| 2006/0136828 A1* | 6/2006 | Asano | 715/733 |
| 2006/0190546 A1 | 8/2006 | Daniell | |
| 2007/0174520 A1 | 7/2007 | Moon | |
| 2007/0180468 A1 | 8/2007 | Gill et al. | |
| 2007/0244987 A1 | 10/2007 | Pedersen et al. | |
| 2007/0288599 A1 | 12/2007 | Saul et al. | |
| 2007/0294632 A1 | 12/2007 | Toyama et al. | |
| 2008/0016255 A1 | 1/2008 | Saint-Hilaire et al. | |
| 2008/0155478 A1 | 6/2008 | Stross | |
| 2008/0205655 A1 | 8/2008 | Wilkins et al. | |
| 2008/0215796 A1 | 9/2008 | Lam et al. | |
| 2008/0299959 A1 | 12/2008 | Geyer et al. | |
| 2008/0307324 A1 | 12/2008 | Westen et al. | |
| 2009/0037680 A1 | 2/2009 | Colbert et al. | |
| 2009/0119664 A1 | 5/2009 | Pike et al. | |
| 2009/0140986 A1 | 6/2009 | Karkkainen et al. | |
| 2009/0172081 A1 | 7/2009 | Bryant et al. | |
| 2009/0199177 A1 | 8/2009 | Edwards et al. | |
| 2009/0300510 A1* | 12/2009 | Gantman et al. | 715/740 |
| 2010/0061534 A1 | 3/2010 | Wang et al. | |
| 2010/0131868 A1* | 5/2010 | Chawla et al. | 715/759 |
| 2010/0159966 A1 | 6/2010 | Friedman et al. | |
| 2010/0278442 A1* | 11/2010 | Parsons et al. | 382/232 |
| 2010/0325391 A1* | 12/2010 | Talla | 712/31 |
| 2011/0047187 A1 | 2/2011 | Sinha et al. | |
| 2011/0179001 A1* | 7/2011 | Lindsley et al. | 707/705 |
| 2013/0124619 A1* | 5/2013 | Steakley | 709/203 |

FOREIGN PATENT DOCUMENTS

| | | |
|---|---|---|
| KR | 1020060127961 | 12/2006 |
| KR | 1020070052673 | 5/2007 |
| KR | 10-0764473 | 10/2007 |
| WO | WO 2007/076103 | 7/2007 |
| WO | WO 2009/070668 | 6/2009 |

OTHER PUBLICATIONS

Murphy, M.A.; Fenn, M.; Goasguen, S., "Virtual Organization Clusters," Parallel, Distributed and Network-based Processing, 2009 17th Euromicro International Conference on , vol., no., pp. 401,408, Feb. 18-20, 2009.*
Kyuchang Kang; Jeunwoo Lee; Hoon Choi, "Personalized virtual machine based on users schedule event," Advanced Communication Technology, 2009. ICACT 2009. 11th International Conference on , vol. 01, no., pp. 293,297, Feb. 15-18, 2009.*
International Preliminary Report on Patentability for International (PCT) Patent Application No. PCT/US2010/045769, mailed Mar. 1, 2012.
Extended European Search Report for EP Patent Application No. 10172803.8, mailed Apr. 4, 2012.
Official Action for U.S. Appl. No. 12/837,275, mailed Apr. 25, 2012.
International Search Report for International (PCT) Patent Application No. PCT/US2010/045769, mailed Apr. 29, 2011.
Written Opinion for International (PCT) Patent Application No. PCT/US2010/045769, mailed Apr. 29, 2011.
Official Action for U.S. Appl. No. 12/837,275, mailed Nov. 5, 2012, 23 pages.
Notice of Allownace for U.S. Appl. No. 12/837,275, mailed Mar. 27, 2013, 12 pages.
Official Action (with English translation) for Korean Patent Application No. 2010-0081661 dated Oct. 18, 2013, 5 pages.
Sugerman et al. "Virtualizing I/O Devices on Vmware Workstation's Hosted Virtual Machine Monitor," USENIX Annual Technical Conference, General Track, 2001, 14 pages.
Official Action with English Translation for Germany Patent Application No. 112010003350.1, dated Jun. 12, 2014, 12 pages.
Notice of Allowance with English Translation for Korea Patent Application No. 10-2010-0081661, dated Apr. 25, 2014, 3 pages.
Chadha et al. "Provisioning of virtual environments for wide area desktop grids through redirecton-write distributed file system," 2008 IEEE International Symposium on Parallel and Distributed Processing, Apr. 2008, pp. 1-8 (Abstract Only).
Kecskemeti et al. "Automatic service deployment using virtualisation," 16th Euromicro Conference on Parallel, Distributed and Network-based Processing, Feb. 2008, pp. 628-635 (Abstract Only).
Sun et al. "Simplifying service deployment with vitual appliances," 2008 IEEE International Conference on Services Computing, Jul. 7-11, 2008, pp. 265-272 (Abstract only).
Official Action for United Kingdom Patent Application No. GB1122357.5, dated Jul. 31, 2015 8 pages.

* cited by examiner

SEAMLESS MOVEMENT BETWEEN PHONE AND PC WITH REGARD TO APPLICATIONS, DISPLAY, INFORMATION TRANSFER OR SWAPPING ACTIVE DEVICE

RELATED APPLICATION DATA

This application claims the benefit of and priority under 35 U.S.C. §119(e) to U.S. Patent Application No. 61/235,838, filed Aug. 21, 2009, entitled "MOJO," which is incorporated herein by reference in its entirety.

FIELD

An exemplary aspect is directed toward information sharing between a communications device and a personal computer. More specifically, an exemplary embodiment is directed toward the seamless movement of one or more of applications, display information, and information between a communications device, such as a mobile communications device, and a personal computer.

BACKGROUND

Remote Desktop Protocol (RDP) is a proprietary protocol developed by Microsoft®, which provides a user with a graphical interface to another computer. The protocol is an extension of the ITU-T T.128 Application Sharing Protocol. There are numerous clients available for most versions of Windows® and other modern operating systems. Some of the features associated with remote desktop services include color support, encryption, audio redirection, file system redirection, printer redirection, port redirection, clipboard sharing, seamless windows, remote program execution, terminal services, Transport Layer Security (TLS) support, as well as multiple monitor support.

SUMMARY

However remote desktop is limited to interactions between two computers. It would be beneficial to allow one or more of information, applications, desktops, and in general any information to be shared between a computer and a communications device, such as a mobile communications device. For example, it would be useful to be able to move a presentation from a computer to a mobile communications device, such that the presentation can be taken to a conference down the hall. Some solutions attempt to address this by requiring a user to load the information on a laptop, USB key, burn it to an optical disk or the like, and then "open" the information on another device located at the remote destination.

In accordance with one exemplary embodiment, through the use of one or more of virtualization and content translation, any information and/or applications can be exchanged between a computer and a communications device. More specifically, one exemplary embodiment utilizes metadata in conjunction with a virtualization environment to allow the exchange of information and/or applications between a personal computer and a communications device, or vice versa.

Another exemplary embodiment allows the screen, or desktop, from either a computer or the communications device to be extended on to the other device. For example, a contact interface screen could be drag-and-dropped on to a communications device interface. Similarly, a communications device-centric interface could be drag-and-dropped onto a computer interface. This could be accomplished, for example, via a docking-station-type transfer and/or virtualization environment.

In accordance with another exemplary embodiment, through the use of user authentication and binding, one or more of applications and information can be shared between the devices. Another aspect performs a translation or conversion of the information and/or application(s) as part of the request to transfer the information and/or application(s) to the other device. For example, the capabilities of the destination device can be queried and the translation of the application and/or information based on the result of the query. For example, if one is transferring a document from a computer to a communications device, and it is determined that the communications device has a lite or view-only version of the native application for the document, little to no conversion may be needed. However, if it is determined that no application on the communications device is capable of displaying the document, a helper application could be downloaded to assist with the viewing. Alternatively, or in addition, the document can be converted to a format supported by the communications device.

Additional exemplary aspects are directed to techniques that allow a user to download an application(s) to the communications device based on one or more of: dynamic discovery of the communications device and/or computer, an ability to run a companion application on the computer that can facilitate communication between the communications device and the computer, an ability to send an application, along with a data document, to the communications device, sending metadata information from the computer to the communications device to let the communications device know about the required operating environment to host the information and/or application being sent by the computer, and an ability for the communications device to accept the metadata information, and take action to dynamically instantiate the indicated virtualization environment to host the application, and start the application in a state indicated by the incoming metadata.

Even further aspects are related to being able to render a data file that was transferred from a computer to a communications device on-the-fly. For example, a virtualization service can be utilized, that can either be stored somewhere on a network, or downloaded, the virtualization service providing the necessary information and support to allow rendering of the data file, information, or the like. In accordance with one exemplary embodiment, the communications device, such as a mobile communications device, can run the virtualization environment. In accordance with another exemplary embodiment, a server that is capable of communication with the communications device can run the virtualization environment and provide support to the communications device as necessary. Therefore, the information can be rendered in the virtualization environment such that it can be viewed, managed, edited, or otherwise manipulated on the communications device. Additionally, this operation can be dynamic such that the virtualization environment is chosen based on information associated with the downloaded file, such as metadata, file extension, or the like. Furthermore, the techniques can be implemented by utilizing a discovery mechanism that is capable of dynamically determining one or more virtualization environments that can support the obtained information, applications, downloaded files, or the like.

In accordance with another exemplary embodiment, screen sharing, application sharing, data sharing and information sharing are accomplished by utilizing metadata in conjunction with a virtualization environment that allows the exchange of any one or more of these types of information between a computer and a communications device or vice versa.

Another exemplary aspect allows the display or screen from either the computer or the communications device to be extended onto the other device. For example, a contact interface screen could be drag-and-dropped onto a computer interface. This could be accomplished via a docking station type of transfer and/or virtualization environment that supports the extension.

Additional exemplary aspects are directed toward the use of user authentication and binding, and sharing one or more of applications and information between the devices.

Even further exemplary aspects are directed toward a translation or conversion of the application/information as part of a request to transfer the information/application to the other device, i.e., from the computer to the communications device or from the communications device to the computer.

Even further exemplary aspects are directed toward allowing a user to download an application to the communications device based on one or more of: dynamic discovery of the communications device and computer, an ability to run a companion application on the computer that can facilitate communication between the communications device and the computer, an ability to send an application, along with a data document, to the communications device and the like.

In more detail, a first exemplary embodiment allows the extension of the screen from a first device, such as a display associated with a computer to the second device, such as a communications device and more particularly, a mobile communications device with a display. In accordance with this exemplary embodiment, the "desktop" from the communications device can be extended to the PC such that a virtualized communications device desktop is displayed on the computer's desktop. In another embodiment, the PC desktop could be directly attached by the communications device. This can allow, for example, dragging and dropping of one or more of applications, data, information, and the like, from the computer's desktop to the virtualized communication device's desktop, which then allows that information to be accessible on the communications device. In a similar manner, in a one or more of information, applications and data can be dragged-and-dropped from the virtualized communications device desktop to the computers desktop. One exemplary advantage associated with this embodiment is that it allows the desktop user to seamlessly control data and applications between the two "desktops."

In operation, a user can navigate to the computer's desktop, via the communication device's interface. A user could then select a particular icon associated with a specific application. The user could then drag the icon associated with this specific application to the communication device's desktop. This would cause the application associated with the icon to be installed on the communications device thereby allowing the user to launch the application from the communications device as needed.

In accordance with another exemplary embodiment, a user working on a computer can control one or more of data, applications, and information on a communications device through the use of the computer's desktop. For example, a user selects data folder "new job" on the computers desktop. The user then drags the "new job" folder icon from the computer's desktop to the communication device's desktop using, for example, a mouse or comparable input device. If format conversion is required, this conversion can happen automatically such that the communications device is able to render information in the "new job" folder as needed. This dragging of the folder then makes available on the communications device the information from the "new job" folder as needed from any location.

Another exemplary embodiment is directed toward the attaching and detaching of the "desktops" of the two devices, e.g., the computer and the communications device. For example, from the communications device, nearby "desktops" can be discovered. Some of these desktops may be virtualized desktops running on another host, a headless server may have a virtual desktop, or the like. To assist with this discovery, a desktop advertisement can be performed, such that, for example, the communications device can select a discovered desktop and then attach to it. The attachment may optionally involve log-in credentials, but as will be appreciated is not limited to log-in semantics. Once the attachment is complete, the seamless connection of the two "desktops" provides for the data, information and application sharing as discussed. As will further be appreciated, the attached desktop may be for a different operating system than the home desktop. Additionally, pointer and input device navigation can work in a seamless manner across both the desktops. Additionally, if a particular device does not have input capabilities, e.g., does not have a keyboard, then, for example, an on-screen virtual keyboard could be generated. As will also be appreciated, the discovery and attachment need not be limited to be from the communications device to the PC, but could also work in the opposite direction, e.g., from the computer desktop discovering the communications device desktop, and attaching thereto. These techniques are operating system agnostic as well as device platform agnostic.

In accordance with some of the exemplary embodiments, service discovery will be utilized where service discovery is a protocol by which clients search or request for service and location information. This service-discovery approach can be utilized to one or more of search for applications, search for information and/or search for data. It can be also utilized to invoke one or more services remotely. The service advertisement is a protocol by which service offers notify clients about services.

Virtualization, in addition to being able to provide the capability of isolating a device from its underlying hardware, allows the emulation of computer resources and software for the purpose of providing a guest operating system a platform matching the instruction set and device I/O model it was compiled for.

A hypervisor is a software monitor that supports one or more guest operating systems using virtualization.

An appliance is a type of software packaging in which software services, applications and configuration information can be bundled with an operating system image for installation on a hypervisor.

In accordance with one exemplary embodiment, the discovery, virtualization, deployment and re-deployment of computer applications and/or services are provided. For example, a phone, such as a network phone, communications device, or mobile communications device searches a network for other computers that have applications and/or data, such as a desktop personal computer. Then the communications device selects the application, configures a hypervisor with a virtualized operating system to receive the application, transfers the application image from the remote computer to the virtualized operating system, configures the virtualized operating system and deploys the application for use. A hypervisor can then snapshot the combined guest operating system and application into a form that can be re-deployed on other devices in the network, and can advertise the availability of the snapshot as an appliance. Other computers/devices subsequently are capable of discovering the appliance.

Another embodiment allows the discovery of virtualized services or applications, validation, deployment and re-deployment enablement. For example, a phone, such as a network phone, mobile communications device, or the like, searches on a network for appliances that can be dynamically downloaded from a computer, using search parameters that include both functional and packaging requirements. The communications device selects and installs a discovered appliance in a virtualized container managed by a hypervisor and validates the appliance for one or more of security, trust and operation. The communications device then licenses the appliance from the appliance provider, and dynamically deploys the device on a hypervisor. The communications device is then capable of reconfiguring the appliance and duplicating it to a repository or other network computer(s) to access.

In accordance with another exemplary embodiment, appliance discovery can find applications or compound service sets packaged in a virtualized container for deployment on a hypervisor. This packaging can simplify installation and provides isolation for the installed application(s) on the appliance from other parts of the system.

Another exemplary advantage is that the appliances can be locally installed rather than invoked services over a network. Discovery selection criteria can include metadata, packaging and functionality. The metadata can include, for example, data types, platform compatibility, compatibility with other applications, and the like. Packaging can include parameters such as guest operating system, hypervisor dependency, security settings, user accounts, networking settings, virtualized hardware requirements (e.g., memory, CPU, disk, network interface card, and the like). Validation and certification mechanisms from an image can also be utilized as well as the use of a trusted appliance.

In accordance with another exemplary embodiment, a new virtualized install phase can be used with a guest container together with the virtualized networks run by the hypervisor together with an optional virtual set of other guest operating systems that are needed to test the appliance in isolation from the normal network. The other guest operating systems can run test cases on the appliance and can host other services that the appliance needs to operate. Completion of these stages can lead to a development stage on the hypervisor where it can be reused.

An optional embodiment includes snapshotting for re-duplication to local appliance repository(s) or other devices. For example, snapshots can be customized for re-targeting as well as snapshots advertised for discovery by other device(s).

In accordance with another exemplary embodiment, appliances can be discovered and/or dynamically discovered such as the appliance(s) fits the required service(s). A discovery pattern can also optionally be shown with multiple criteria, such as appliance function, guest operating system, and configuration. In accordance with one exemplary phone-specific embodiment, appliances can be discovered and installed, such as appliances that support visitor services, MMP support from third party phone applications and DECT/CAT-IQ/multi-NIC integration. Additionally, application service bundles can be discovered and installed to support one or more of finance, content delivery, business tools, entertainment, and in general any tool for any data type or content as necessary.

In another exemplary embodiment, appliance discovery and validation can be used as a stand-alone embodiment. For example, many entertainment and consumer electronics devices including HDTVs, PVRs, game machines, home appliances, digital picture frames, digital cameras, and so on are enabled with network interfaces, user interfaces that are a type of desktop, and application capability. In addition, there has been some work in providing virtualization technology for some of these device categories. Therefore, an exemplary embodiment extends the techniques disclosed herein to at least the above categories of devices. As an example, a communications device could perform desktop sharing with an HDTV (or its associated set-top box, PVR, etc.), game machine, home appliance, etc., to do the same kinds of application sharing and data transfer that is described herein for the PC and communications endpoints.

The discovery may prefer trusted appliance over un-trusted appliances. Appliance trust can be multi-part, such that trust in the guest operating system (e.g., patch level, security configuration, operating system certification, and the like) or trust in the installed services/applications such as version of security information. Discovery and loading of a trusted appliance can involve validating the operating system and the component services. Optional additional steps may include applying patches, performing test or self-tests on individual services or the appliance in total. This can be implemented as a type of composite trust binding applied to services on the appliance.

In another exemplary embodiment, the sharing and discovery capability for can be extended to:

a communication device to cooperate with rather than try to duplicate or replace a PC, laptop or other full and general purpose computing platform;

reduce the need or likelihood of having to carry a communication and a collaboration/laptop/PC device; and/or to supply a stationary or mobile, full featured, presented in a more integrated/accessible manner, suitable for, for example, conference rooms (by sharing onto larger display of other devices, etc.), communication/collaboration solution not possible with today's technology.

These and other advantages will be apparent from the disclosure contained herein. The above-described embodiments and configurations are neither complete nor exhaustive. As will be appreciated, other embodiments are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

BRIEF DESCRIPTION OF THE DRAWINGS

The exemplary embodiments will be described in detail, with reference to the following figures, wherein:

FIG. 9 illustrates a method supporting appliance discovery and loading; and

FIG. 10 is a flowchart illustrating an exemplary method for sharing one or more of applications, data, information and the like between devices.

FIG. 11 is an exemplary messaging framework between a device, such as a communications device, and its various indexes, repositories, hypervisors, containers, and the like.

DETAILED DESCRIPTION

Some embodiments will be illustrated below in conjunction with an exemplary communication system. Although well suited for use with, e.g., a system using switch(es), server(s) and/or database(s), communications endpoints, etc., the embodiments are not limited to use with any particular type of communication system or configuration of system elements. Those skilled in the art will recognize that the disclosed techniques may be used in any communication application in which it is desirable to provide enhanced communications.

Figure 1:
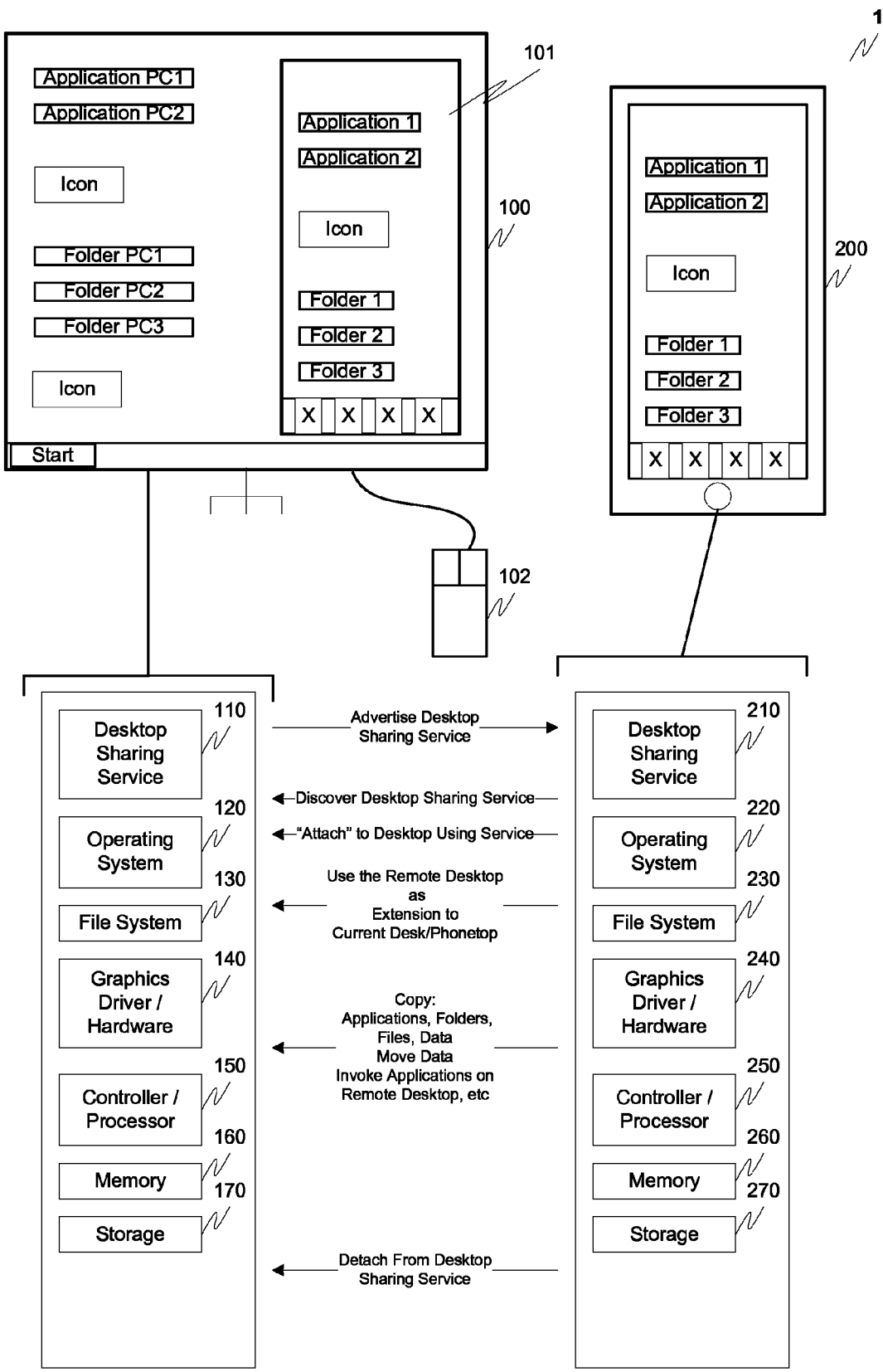
FIG. 1 illustrates an exemplary communications environment.

Referring initially to FIG. 1 an exemplary communication environment 1 will be described in accordance with at least some embodiments. The communication environment can comprise (in addition to well-known componentry) a communication network connecting a plurality of communication devices capable of sending one or more communications in one or more modalities.

In one embodiment, the communication environment may include a switch that may include a private branch exchange (PBX) system or any similar type of switching system capable of providing a telephone service to one or more entities such as an enterprise associated with the switch, a user associated with the switch, such as a caller or callee, or the like. The switch may be one of a number of known exchange systems including, but not limited to, Private Automated Branch Exchange (PABX), Computerized Branch Exchange (CBX), Digital Branch Exchange (DBX), or Integrated Branch Exchange (IBX). The switch may also comprise a switching fabric that provides for the connection of multiple endpoints such as communication devices associated with call participants, servers and databases. The switching fabric can provide the functionality to direct incoming and/or outgoing calls to various endpoints and further provides for conferencing capabilities between endpoints as well as the ability for forward information associated with presence.

The communication devices (such as second device 200) may be packet-switched or circuit-switched and can include, for example, IP desk phones such as the Avaya Inc.'s, 9600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, smartphones, and conventional wired or wireless telephones. Additional devices that may be included but are not shown in the communications environment include but are not shown are computer-based internet browsers and/or applications specific to a particular communications modality, such as an application (and associated communications hardware) that supports blogging from a computer or mobile computing or communications device.

The embodiments will also be discussed in conjunction with an exemplary communication network. Although well suited for use with, e.g., a system having a private branch exchange (PBX) or other similar contact processing switch, the embodiments are not limited to use with any particular type of communication system switch or configuration of system elements.

One or more switches may also be included in the communications environment and may include a PBX, an enterprise switch, or other type of telecommunications system switch, as well as other types of processor-based communication control devices such as servers, computers, adjuncts, etc. By way of example, the switch may be implemented as an otherwise conventional DEFINITY™ or MULTIVANTAGE™ Enterprise Communication Service (ECS) or Avaya® Aura Communication Manager™ communication system switch available from Avaya Inc. Other types of known switches are well known in the art and therefore not described in detail herein.

The second device or communication device 200 may be a wired desktop telephone terminal or any other type of terminal capable of communicating. The word "terminal" and "communications device" and "phone" as used herein should therefore be understood to include not only wired or wireless desktop telephone terminals but also other types of communication devices, including without limitation IP softphones, IP hardphones, mobile telephones, personal computers, laptops, personal digital assistants (PDAs), smart phones, etc.

A switch could also be coupled via one or more links to a network. In one configuration, communication lines or links are trunk lines and the network is the public switched telephone network (PSTN). In another configuration, the communication lines pass through an optional gateway to a packet-switched network, such as the Internet. In any event, the lines or links carry incoming information to and from one or more of the first and second devices. It should be noted that the embodiments disclosed herein do not require any particular type of information transport and the embodiments may be implemented with any desired type of transport medium as well as combinations of different types of transport media.

FIG. 1 illustrates an exemplary communications environment 1. The communications environment 2 includes a first device and a second device. The first device is, for example, a personal computer, laptop computer, netbook, or the like, with an associated display 100 and input device, such as input device 102, which can be a mouse, keyboard, or in general any input device. The second device 200 is, for example, a communications device such as a phone, desktop phone, mobile phone, cell phone, smart phone, PDA, or the like, and in general can be any communications device that is capable of exchanging one or more of communications, messages, information, data, and the like, with one or more other devices.

The first device 100 includes, in addition to well known componentry, desktop sharing service 110, operating system 120, file system 130, graphics driver/hardware 140, controller/processor 150, memory 160 and storage 170.

The second device 200, in addition to well known componentry, includes desktop sharing service 210, operating system 220, file system 230, graphic driver/hardware 240, controller/processor 260, memory 260 and storage 270.

The first device 100 can include one or more installed applications, stored data, icons representing information, data, icons, links, or the like, and can also include one or more folders or directories of information stored either on the PC or, for example, on a network drive. For example, the first device 100 can include applications such as application PC1, application PC2, and the like. Similarly, the first device 100 can include folders such as folder PC1, folder PC2, folder PC3, and the like. In addition to well known functionality, such as a start button, the first device 100 can also display, for example, one or more icons that are selectable by, for example, input device 102.

In a similar manner, the second device 200 can include applications, such as application 1, application 2, and the like. The second device 200 may also optionally include one or more folders such as folder 1, folder 2, folder 3, and the like, as well as one or more icons similar to that on the first device 100. The second device 200 may also include one or more virtual or hard buttons that allows for interaction with the device via, for example, a touch screen, virtual keyboard, track ball, track pad, or the like.

As discussed, an exemplary aspect is directed toward the ability to share one or more of applications, information, data, and the like, between the first and second devices.

In operation, a request to one or more of exchange information and/or applications between devices is detected. This is initiated by: a request to extend the screen from one device to another device being detected, a request to share one or more of applications and information being detected, and a translation and/or conversion is requested and/or a request to download one or more applications being detected.

Even more generally, the request to exchange any type of data, information, applications or the like, between the first and second device, or vice versa, can trigger the steps illustrated in FIG. 1 that allow the exchanging of this information between the devices. Even more specifically, and in accordance with the first exemplary embodiment, the ability to share the above types of information starts with the advertising of a desktop sharing service. While the embodiment illustrated in FIG. 1 is directed toward an ability to share the "desktop" of the second device 200 on the first device 100, it should be appreciated that the systems, methods and techniques disclosed herein will also work in the opposite direction.

With the desktop sharing service 110 advertising the ability to share the desktop, the desktop sharing service 210 discovers, detects, or otherwise recognizes the advertised desktop sharing service and returns to the first device 100, an acknowledgement that the desktop sharing service is being advertised, has been discovered, and that the second device 200 would like to attach the desktop service being hosted by the first device 100. Next, and in cooperation with one or more of the operating system 220, file system 230, graphics driver hardware 240, controller/processor 250, memory 260 and storage 270, a remote desktop is established on the first device 100, as illustrated by extended desktop (or virtual desktop) 101, which is displayed on the first device 100 in cooperation with one or more of the operating system 120, file system 130, graphics driver/hardware 140, controller/processor 150, memory 160 and storage 170.

With the extension of the desktop from the second device 200 onto the first device 100, one or more of applications, folders, files, data, and the like can be copied, as well as data moved, as well as the invocation of one or more applications on the original desktop executed. For example, using input device 102, a user can one or more of drag-and-drop one or more of application PC1, application PC2, icon, folder PC1, folder PC2, folder PC3, or the like, to the virtual desktop 101 associated with the second device 200. In a similar manner, and again using input device 102, the user can drag-and-drop one or more of application 1, application 2, icon, folder 1, folder 2, folder 3, or the like from the virtual desktop 101 to desktop associated with the first device 100. This exchanging of information, data, applications, and the like can continue as long as necessary, with the conclusion of desktop sharing be initiated by a message being sent from the second device 200 to the first device 100 indicating a desire to detach from the desktop sharing service. Upon detaching from the desktop sharing service, with the cooperation of the desktop sharing service 210 and the desktop sharing service 110, the virtual desktop 101 on the first device 100 is removed from the display of the first device with the sharing of one or more of information, data, applications, and the like, concluded.

As will be appreciated, and in general, any types of information can be exchanged between the two devices, such as contacts, calendar items, data files, information files, applications, such as one or more executables, images, videos, multimedia information and in general any information that can be stored on either one of the first device 100 and second device 200 can be exchanged there between with, for example, a copy or move motion that either copies, or moves, respectively, the information from one device to the other.

Figure 2:
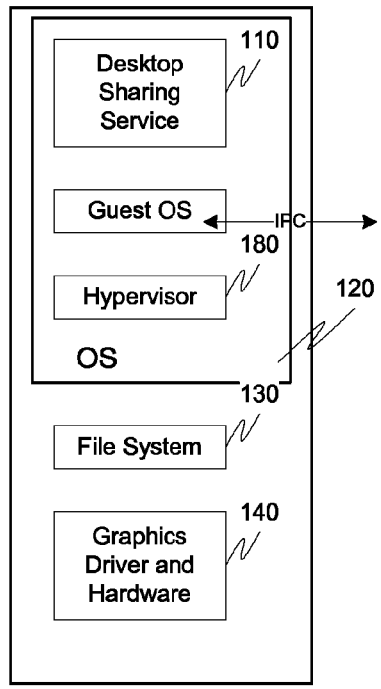
FIG. 2 illustrates an exemplary configuration of a computing device.
Figure 3:
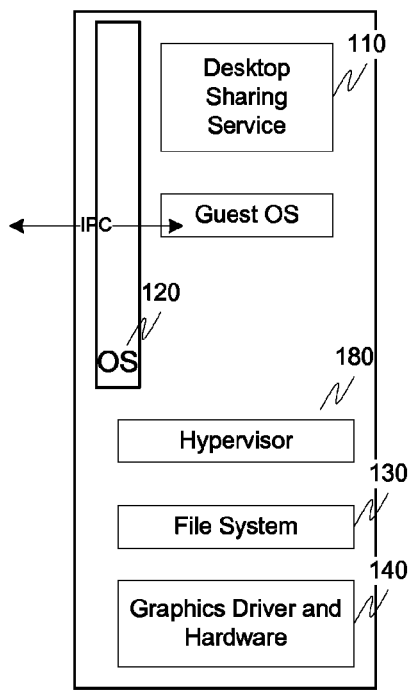
FIG. 3 illustrates an exemplary configuration of a computing device.
Figure 4:
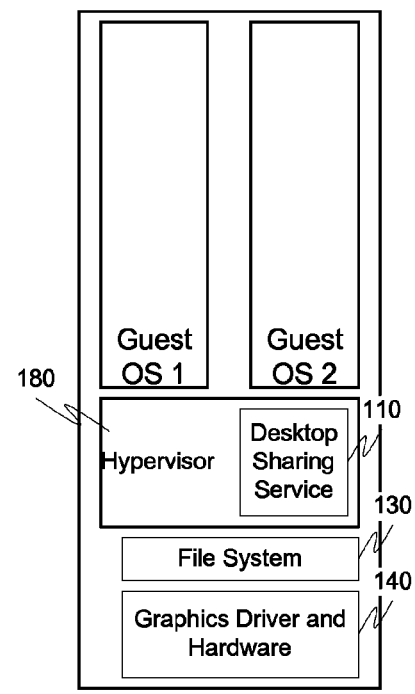
FIG. 4 illustrates an exemplary configuration of a computing device.

FIGS. 2-7 illustrate exemplary configurations of how either one of the first device and the second device can be configured to allow exchanging of information there between. More specifically, and as discussed, the sharing service may run as an operating system process, an operating system driver, an operating system application, in a virtualized operating system layer, in a hypervisor, or some combination thereof. Specifically, FIGS. 2-4 illustrate exemplary aspects that are computer-based implementations placing the desktop sharing service in the first device 100. In particular, in FIG. 2, the desktop sharing service 110, guest operating system, and hypervisor 180 are associated with the operating system 120. Inter-process communications (IPC) are sent from the guest operating system to the other device.

In FIG. 3, the guest operating system sends the inter-process communications via the operating system, the guest operating system being associated with, yet separate, from operating system 120 in a similar manner as the desktop sharing service 110, hypervisor 180, file system 130 and graphics driver and hardware 140.

In FIG. 4, the desktop sharing service 100 is embedded within the hypervisor 180 and/or distributed across one or more components that can either be based in one or more of hardware and software. In this particular exemplary embodiment, the hypervisor 180 can optionally be on hardware with the guest operating system(s) being, for example, an Android® based operating system with a desktop sharing service.

Figure 5:
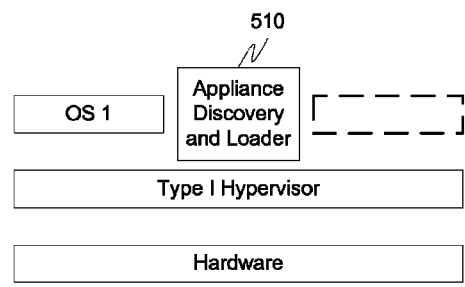
FIG. 5 illustrates an exemplary configuration of a hypervisor and associated components.
Figure 6:
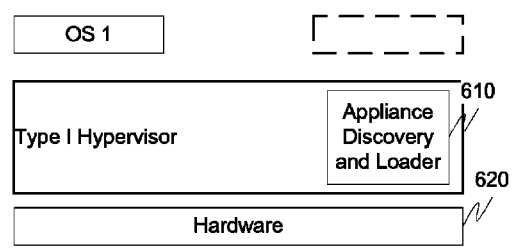
FIG. 6 illustrates an exemplary configuration of a hypervisor and associated components.
Figure 7:
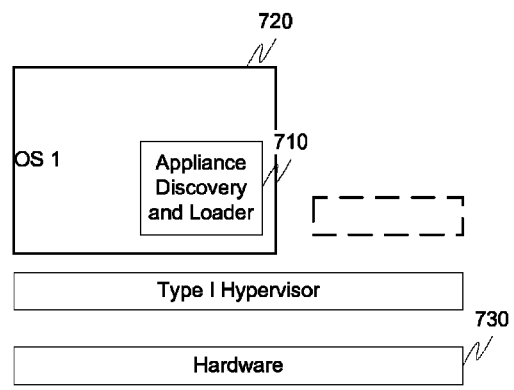
FIG. 7 illustrates an exemplary configuration of a hypervisor and associated components.

FIGS. 5-7 illustrate exemplary configurations for virtualized environments that support appliance discovery and loading. In these exemplary embodiments the configurations include a module in a separate virtual container, a module built in to a hypervisor and an installable component. More configurations can be shown for different types of hypervisors. Even more specifically, in FIG. 5, the appliance discovery and loader 510 is a module in a separate virtual container layered on top of a type 1 hypervisor and associated hardware. In FIG. 6, the appliance discovery and loader 610 is built into the type 1 hypervisor, which is running on associated hardware 620. In FIG. 7, the appliance discovery and loader 710 is an installable component in the operating system 720 that in a similar manner runs on a type 1 hypervisor running on hardware 730. In general, and regardless of the location of the appliance discovery and loader, the module can act as, for example, an operating system service which can be invoked by one or more of applications, optionally subject to security policies, and can be used to one or more of discover and load one or more appliances. A list of the available appliances may be stored in one or more repositories on the network, or in general in any kind of distributed database, with the location of the repositories and databases optionally being preconfigured or discoverable using, for example, standard search protocols.

Figure 8:
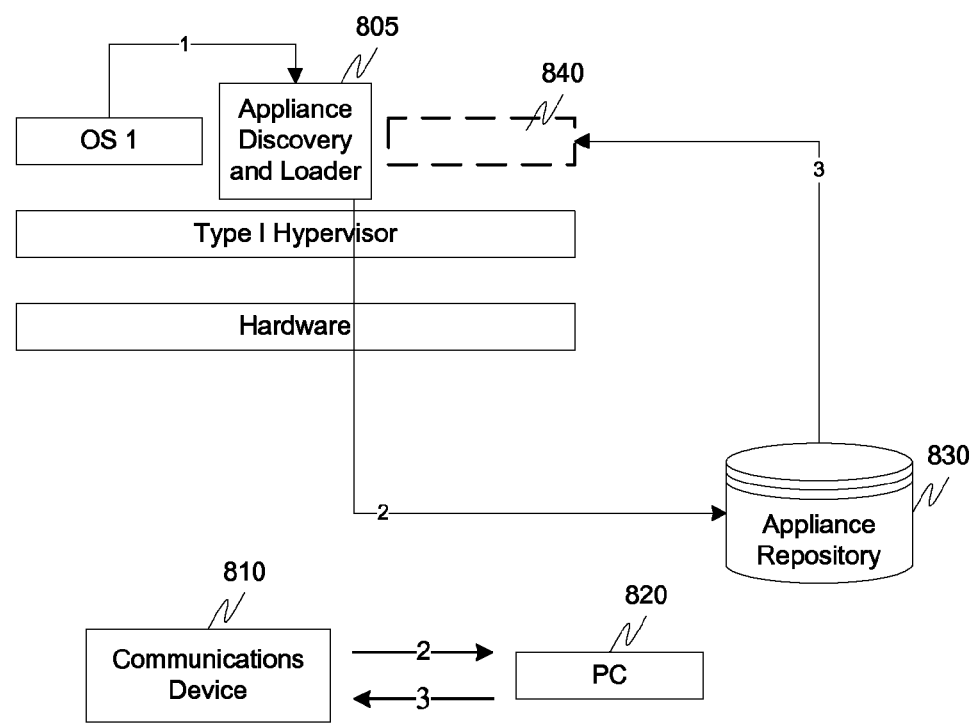
FIG. 8 illustrates exemplary steps for loading an appliance.

FIG. 8 illustrates an exemplary discovery and load procedure for the loading of an appliance into a second device, such as communications device 810 from a first device, such as PC 820. In particular, in step 1, the operating system requests to find an appliance with a particular name. Next, the appliance discovery and loader 805 can optionally validate the request and determine whether the request is acceptable based on one or more of rules, policies, security policies, and the like. Assuming the request to find a particular appliance is valid, in step 2 the appliance discovery and loader 805 sends the request to the appliance repository 830 to discover the one or more appliances being requested. Assuming at least one match is found, the best candidate according to the discovery request is determined, and in step 3 the selected appliance is downloaded and installed into container 840. The hypervisor can then manage the container 840 including one or more of starting and stopping, connections to and therefrom, security, mapping the physical resources, and the like. In this particular exemplary embodiment, the PC 820 contains the appliance repository 830, with the appliance discovered therein being returned and installed on the communications device 810.

Figure 9:
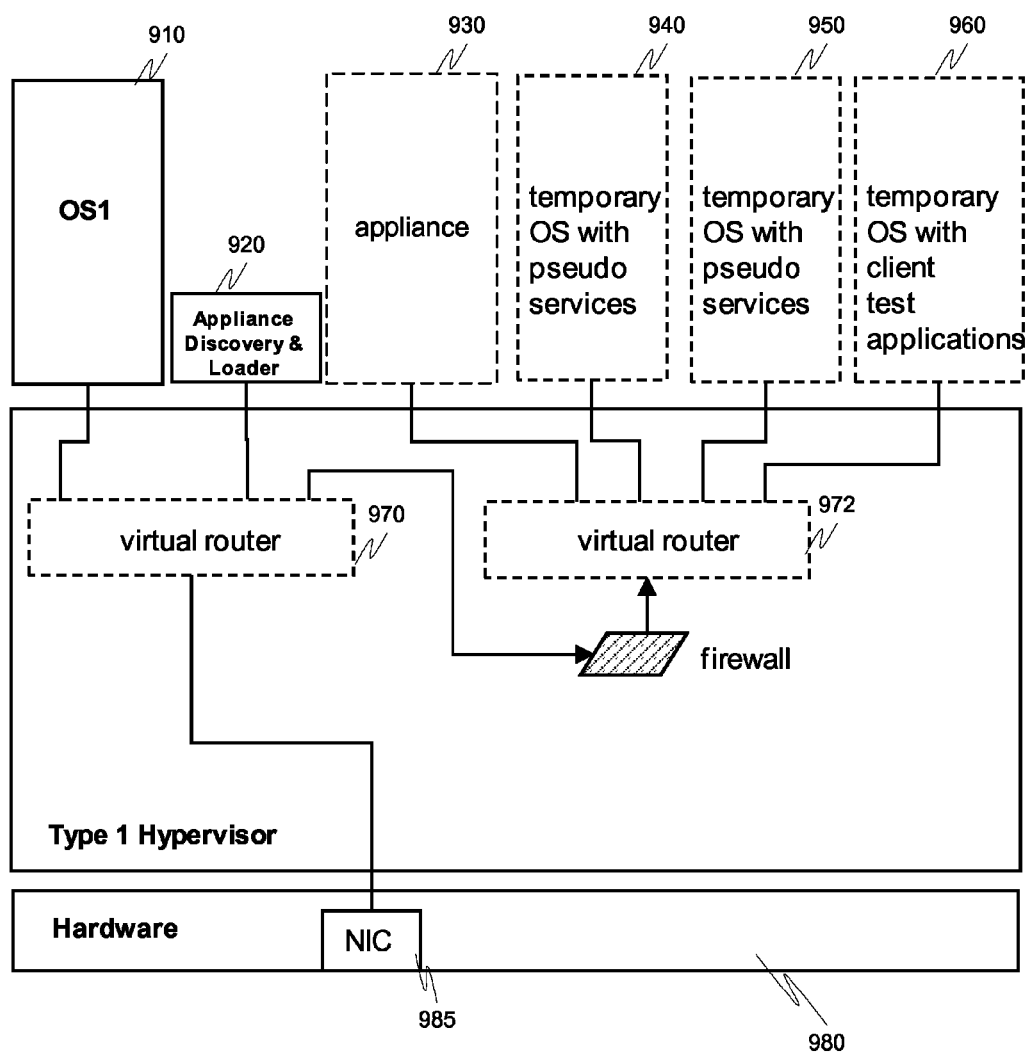
FIG. 9 illustrates an architecture supporting appliance discovery and loading.

FIG. 9 illustrates an exemplary technique and configuration of associated hardware, hypervisors, and operating systems where the loaded appliance can be validated in isolation. In particular, in FIG. 9 the architecture includes an operating system 910, an appliance discovery and loader 920, appliance 930, temporary operating system with pseudo services 940, a second temporary operating system with pseudo services 950, a temporary operating system with client test applications 960, one or more virtual routers 970/972, an optional firewall, and hardware 980 that includes a network interface card (NIC) 985. In operation, the appliance 930 is loaded into a container managed by the hypervisor. The virtual router 970 can be configured with an isolated address base so that network traffic can be initiated to parallel containers on the same virtual router. The operating system 910 and appliance discovery and loader 920 can control services and test applications in temporary containers, and can control configuration of the virtual router. Moreover, the operating system 910 and appliance discovery and loader 920 can continue to have access to networks mapped to physical network interface cards 985.

Figure 10:
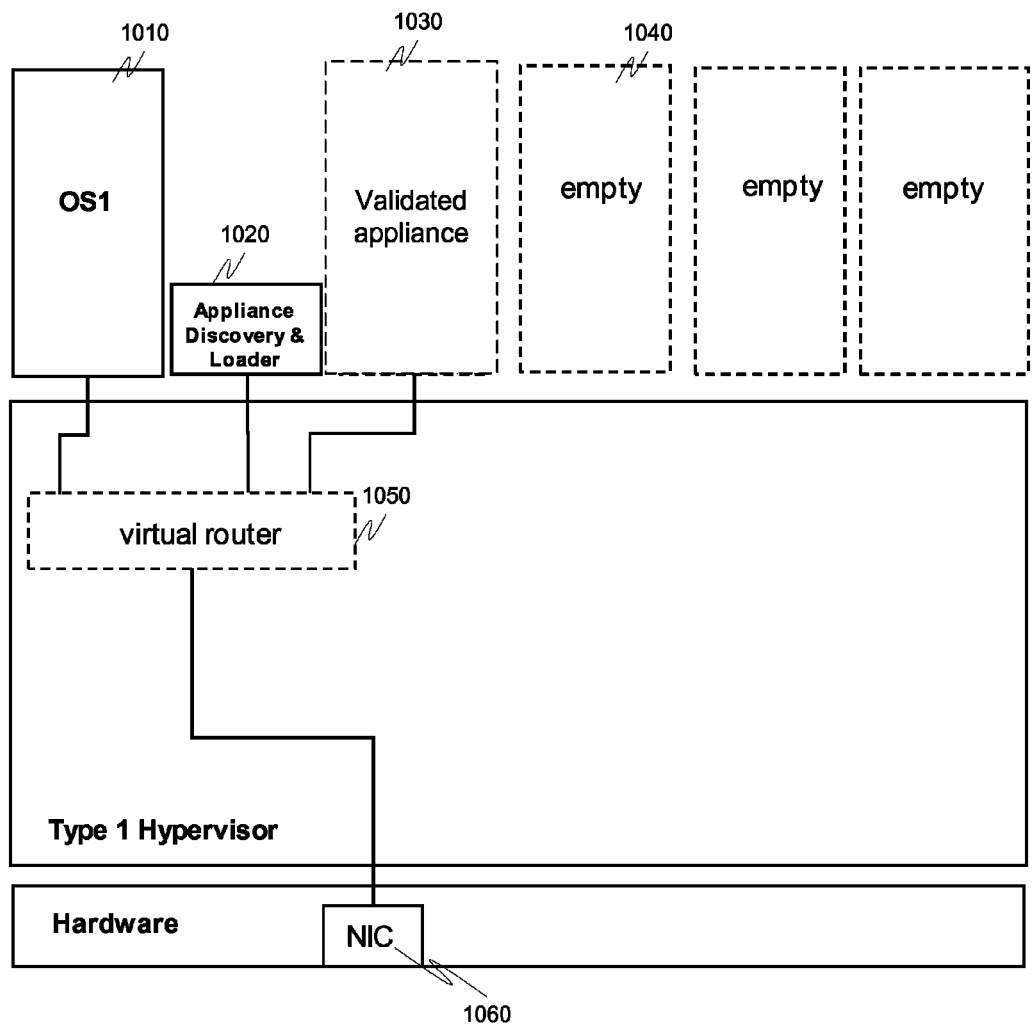
FIG. 10 illustrates an architecture supporting appliance discovery and loading.

FIG. 10 illustrates an exemplary method of deploying a validated appliance in accordance with an exemplary aspect. In particular, in FIG. 10, the result of a successful deployment is shown where validation test(s) succeeded. In FIG. 10 the containers, such as empty containers 1040, and virtual router 1050, can be reconfigured for deployment of the validated appliance with temporary operating systems such as those illustrated in FIG. 9 dropped with the virtual router 1050 being reconfigured to provide direct access to the network interface card 1060.

Figure 11:
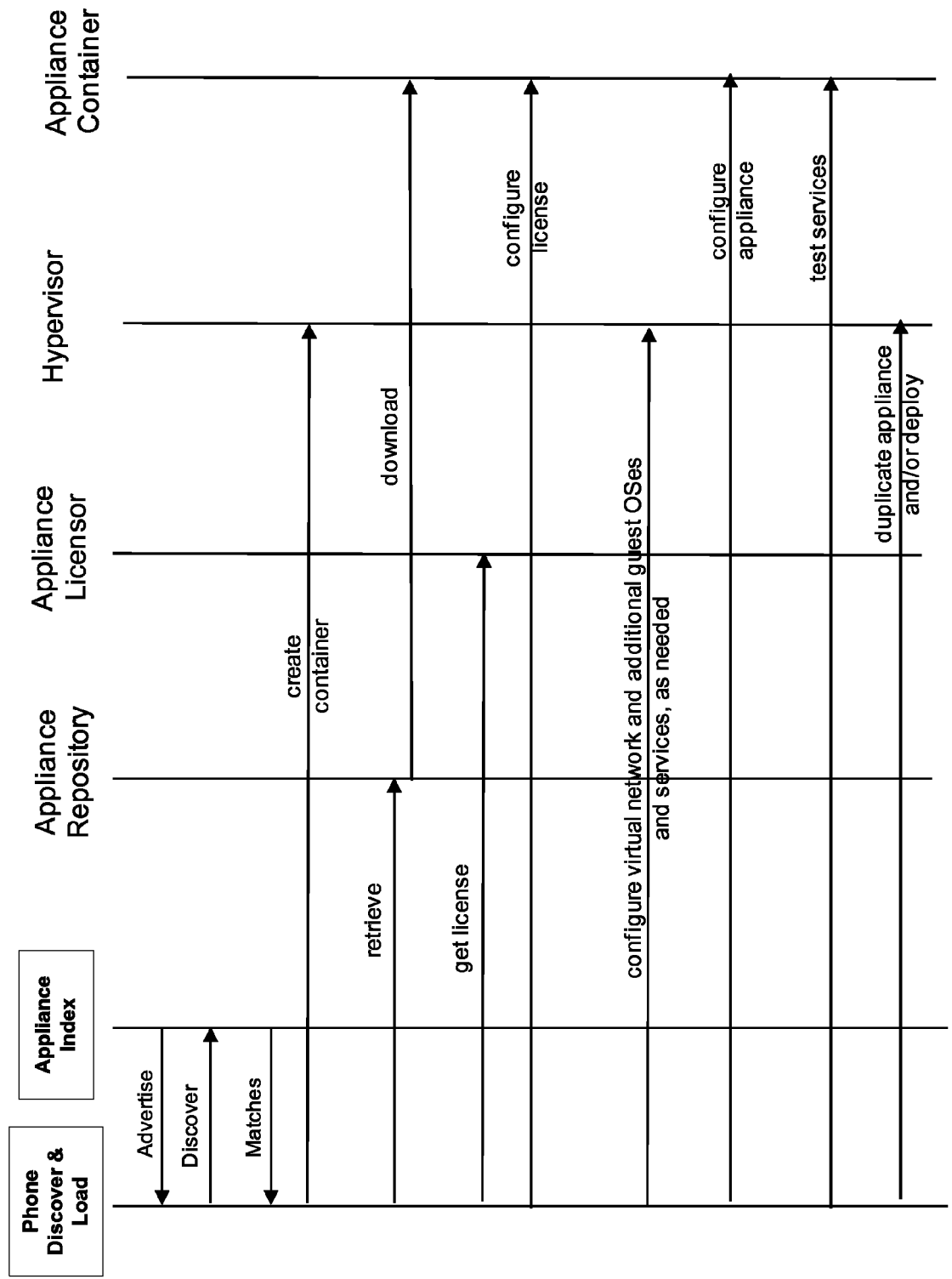

FIG. 11 illustrates an exemplary messaging framework between a second device, such as a communications device, and their various indexes, repositories, hypervisors, containers, etc. In particular, control commences with an advertise message from the appliance index to the communications device. This is answered with a discover message from the communications device back to the appliance index with one or more matches to the discovery request returned to the communications device.

Next, the communications device, in cooperation with the hypervisor creates a container. Next, the communications device retrieves, from the appliance repository, one or more appliances that match with them being downloaded, in the next step, to the appliance container. An optional next step is that the communications device can secure a license from the appliance licensor which can optionally be followed by the configuration of the license for the appliance that is now stored in the appliance container.

Next, and as needed, and in cooperation with the hypervisor, one or more of a virtual network and additional guest operating systems and services can be configured, as needed. The appliance stored in the appliance container can then be configured with a testing of the services optionally performed with control continuing to optionally duplicate the appliance and/or deploy the now tested, and validated appliance stored in the appliance container.

Figure 12:
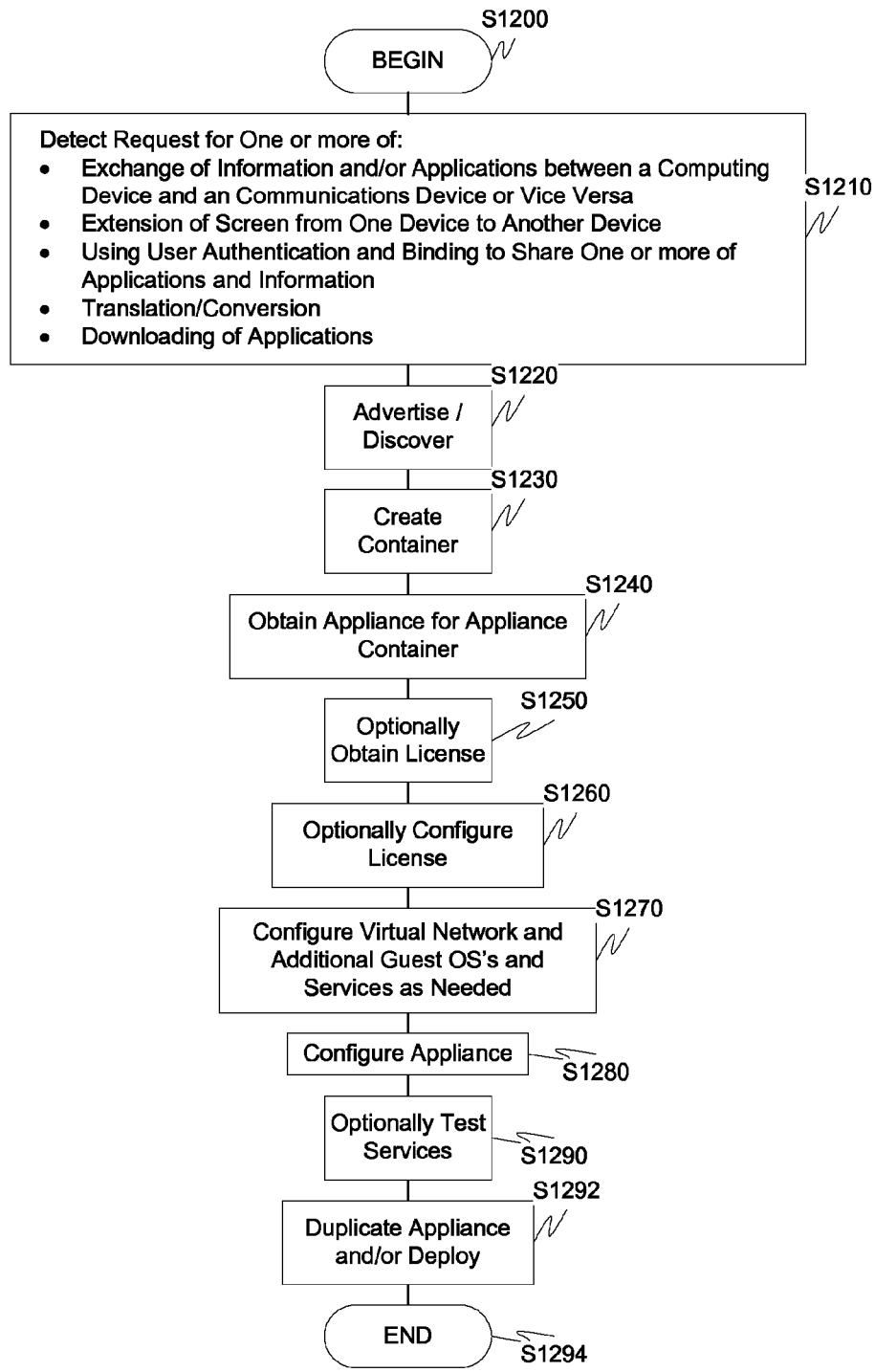
FIG. 12 is flow chart outlining an exemplary method for sharing one or more of information, data, applications, and the like between two devices, such as a personal computer and a communication device.

FIG. 12 is a flowchart outlining an exemplary method for sharing one or more of information, data, applications, and the like, between two devices such as a personal computer and a communications device. In particular, control begins in step S1200 and continues to step S1210. In step S1210, one or more of a request for exchanging of information or applications, an extension of a screen from one device to another, sharing one or more of applications and information, translation and/or conversion, and the downloading of applications is detected. Next, advertising of a remote desktop is advertised with a corresponding discovery performed. Then, in step S1230, one or more containers are created as necessary. Control then continues to step S1240.

In step S1240, one or more appliances are obtained and stored in an appliance container. Next, in step S1250, a license for the obtained appliance can optionally be obtained. Then, in step S1260, the license can optionally be configured as necessary with control continuing to step S1270.

In step S1270, one or more of a virtual network and additional guest operating systems and services can be configured as needed. Next, in step S1280, the appliance is configured as needed with the services optionally being tested in step S1290. In step S1292, the appliance can one or more of be duplicated and deployed thereby allowing the sharing of information as discussed above, with control continuing to step S1294 where the control sequence ends.

Additional exemplary aspects are directed toward the ability to dynamically discover one or more of the communications device and the personal computer. Another exemplary aspect is directed toward an ability to run a companion application on the computer that can facilitate communication between the communications device and the computer. Even further aspects are directed to an ability to send an application, along with a corresponding data document, from the personal computer to the communications device, or vice versa. In order to send an application from a computer to the communications device, one exemplary embodiment utilizes metadata information sent from the computer to the communications device to let the communications device know about the required operating environment to host the application(s) being sent to it from the computer.

Another exemplary aspect is directed toward an ability of the communication device to accept the metadata information, and take action to dynamically instantiate the indicated virtualization environment to host the application, and start the application in the state indicated by the incoming metadata.

Additional embodiments are directed toward an ability to utilize a protocol where metadata information is passed along in a protocol that allows a customization of a virtualization environment to host a foreign application. Another exemplary aspect is directed toward a central repository versus a broadcast protocol. A device that is looking for a particular type of application can query its neighbors, using, for example, a broadcast mechanism to look for other devices running the desired application, verify that the application running on the other device is from a legitimate application repository, and initiate downloading of the application directly from the other device without necessarily having to query a central repository. Another exemplary aspect is directed toward an ability to utilize service discovery from virtualized services, which includes an access control mechanism that allows different versions of an application, depending on the addition of the application purchased or licensed. A full version of the application can be stored in the repository, and during the download instantiation process, the application and its container exchange information that allows that application to run in a full-featured mode or a reduced functionality mode, depending on the download/licensing/purchase agreement restrictions.

Another exemplary aspect allows a first device to communicate with other devices in the network, and negotiate, allocate and instantiate a remote virtualization container and a remote device, but use of the output of the applications running in the container is passed back to the first device. This type of distributing processing has exemplary advantages such as: the remote device is able to place bounds on how much a virtualization instance requested by a remote device can use of its resources and allows any application to run on a remote device that has idle capacity, regardless of the chip platform, operating system that the device is built for, or the like, and the negotiation between the requesting device and the requested device can involve a metadata information exchange that, for example, tells the virtualization environment on the remote device to load an operating system and run an operating system specific application on another type of personal computer.

Additional aspects use a central repository as a central backup server, or virtualization environments from devices on the network can be snap-shotted and saved on the server. This can be used, for example, by a user initiated request, and/or automatically requested as initiated, for example, by a direction from one or more network servers.

The various embodiments include components, methods, processes, systems and/or apparatus substantially as depicted and described herein, including various embodiments, sub-combinations, and subsets thereof. Those of skill in the art will understand how to make and use the disclosed techniques after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the embodiments to the form or forms disclosed herein. In the foregoing Detailed Description for example, various features are grouped together in one or more embodiments for the purpose of streamlining the disclosure. This method of disclosure is not to be interpreted as reflecting an intention that the claims require more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as separate preferred embodiments.

Moreover, though the description of the embodiments has included description of one or more features and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

While the above-described flowcharts have been discussed in relation to a particular sequence of events, it should be appreciated that changes to this sequence can occur without materially effecting the operation of the system(s). Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols described herein can be implemented on a special purpose computer (or communications device) in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques disclosed herein.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communication arts.

Moreover, the disclosed methods may be readily implemented in software that can be stored on a non-transitory storage medium, executed on a programmed general-purpose computer with the cooperation of a controller and memory, a special purpose computer, a microprocessor, or the like. In these instances, the systems and methods herein can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with exemplary embodiments, systems, apparatuses and methods for enhancing communications. While the embodiments have been described in conjunction with a number of features, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

The invention claimed is:

1. A method for exchanging information between a computing device and a communications device comprising:
    detecting a request for sharing of one or more of information, applications, and data, wherein the one or more of information, applications, and data are an appliance;
    advertising a desktop sharing service;
    discovering another desktop sharing service;
    bundling the appliance with an operating system image for management by a hypervisor on a remote desktop;
    attaching to the remote desktop, the remote desktop being provided as an extension to the communication device's desktop or the computing device's desktop;
    downloading the bundled appliance and operating system image to the another desktop sharing service;
    installing the downloaded appliance and the operating system image into a temporary container;
    validating, by the hypervisor, the installed appliance and the operating system image in the temporary container; and
    in response to validating the installed appliance and the operating system image in the temporary container, deploying, by the hypervisor, the installed appliance and the operating system image in an appliance container.

2. The method of claim 1, further comprising performing one or more of a translation and conversion based on metadata.

3. The method of claim 1, further comprising enabling drag-and-drop capabilities from the computing device to the communications device or from the communications device to the computing device.

4. The method of claim 1, further comprising establishing a desktop sharing service between the computing device and the communications device.

5. The method of claim 1, further comprising managing by the hypervisor one or more containers, and one or more of starting or stopping of the appliance, connections and mapping to physical resources.

6. The method of claim 1, wherein the communications device is one or more of a wired or wireless phone, a desktop phone and a smart phone and wherein the computing device is one or more of a personal computer, laptop computer, and netbook.

7. The method of claim 1, further comprising obtaining one or more licenses for the appliance.

8. The method of claim 1, further comprising:
    making a request to find the appliance in an appliance repository on the computing device;
    finding the appliance in the appliance repository on the computing device; and
    wherein the downloaded appliance is downloaded on the communication device and wherein the computing device and the communication device are end user devices.

9. The method of claim 1, further comprising:
    in response to attaching to the remote desktop, determining if the remote desktop does not have a keyboard; and
    in response to determining that the remote desktop does not have a keyboard, generated an on-screen virtual keyboard on the remote desktop.

10. The method of claim 1, further comprising:
    installing the downloaded appliance and the operating system image into a container; and
    running, by the hypervisor, the downloaded appliance and the operating system image in the container.

11. A non-transitory computer-readable information storage media that includes computer executable instructions that when executed by a computer perform the steps of claim 1.

12. One or more means for performing the steps of claim 1.

13. A system to exchange information between a computing device and a communications device comprising:
    an operating system that detects a request for sharing of one or more of information, applications and data, wherein the one or more of information, applications, and data are an appliance;
    a desktop sharing service that advertises a desktop sharing service, discovers another desktop sharing service, and bundles the appliance with an operating system image for management by a hypervisor on a remote desktop, wherein the desktop sharing service attaches to a remote desktop, the remote desktop being provided as an extension to the communication device's desktop or the computing device's desktop, downloads the bundled appliance and operating system image to the another desktop sharing service, and installs the downloaded appliance and the operating system image into a temporary container; and
    a hypervisor that validates the installed appliance and the operating system image in the temporary container and deploys the installed appliance and the operating system image in an appliance container in response to validating the installed appliance and the operating system image in the temporary container.

14. The system of claim 13, wherein the operating system performs one or more of a translation and conversion based on metadata.

15. The system of claim 13, wherein the desktop sharing service enables drag-and-drop capabilities from the computing device to the communications device or from the communications device to the computing device.

16. The system of claim 13, wherein the desktop sharing service between the computing device and the communications device allows for one or more of moving and copying of the one or more of information, applications and data.

17. The system of claim 13, wherein the hypervisor manages one or more containers, and one or more of starting or stopping of the appliance, connections, and mapping to physical resources.

18. The system of claim 13, wherein the communications device is one or more of a wired or wireless phone, a desktop phone and a smart phone and wherein the computing device is one or more of a personal computer, laptop computer, and netbook.

19. The system of claim 13, further comprising a processor that obtains one or more licenses for the appliance.

* * * * *